March 31, 1936.  F. D. CHENEY  2,036,021
MANUFACTURE OF ORNAMENTAL COATED GLASS ARTICLES
Filed Dec. 23, 1933
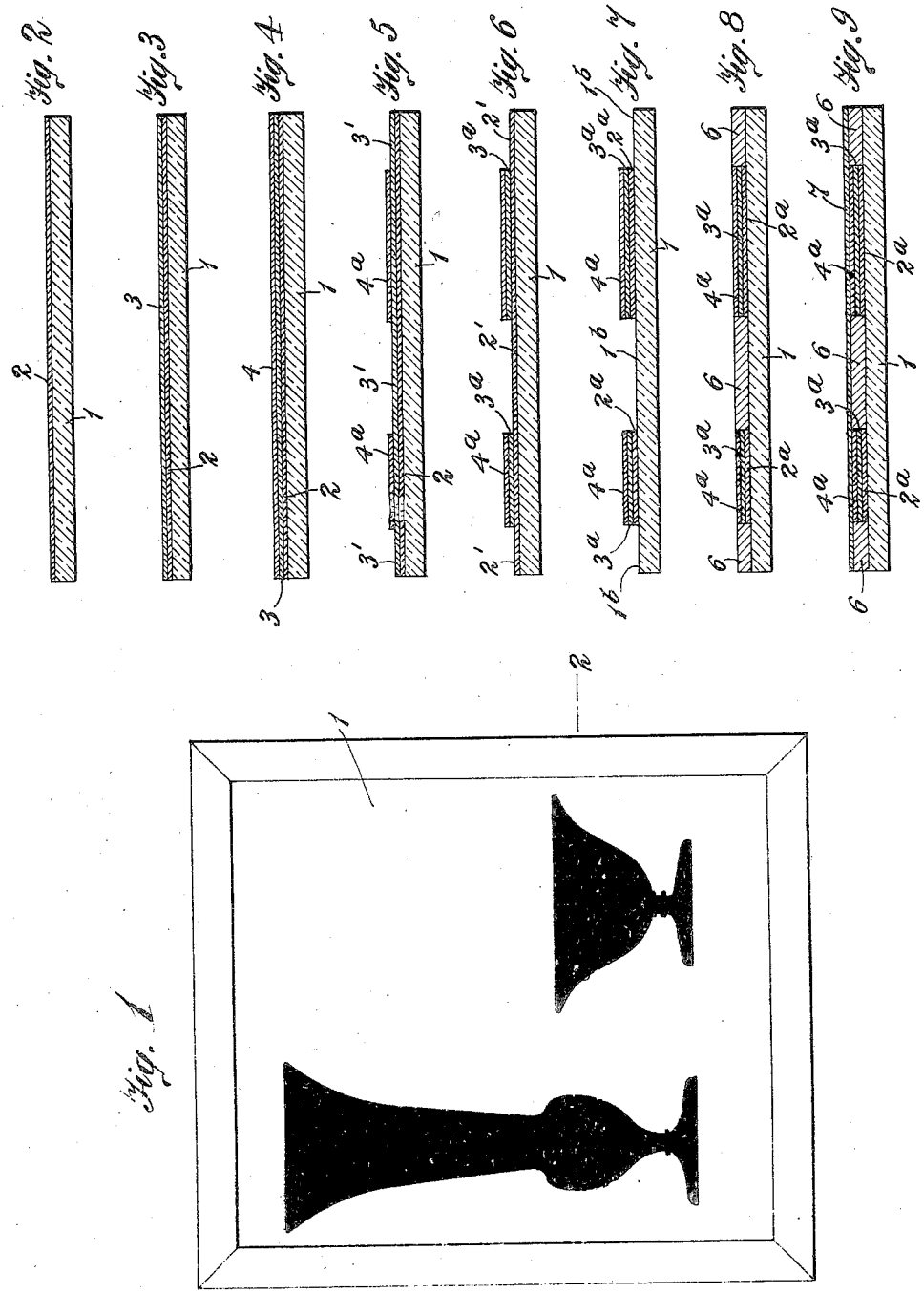
INVENTOR
Frank Dexter Cheney
BY
ATTORNEY Patented Mar. 31, 1936

2,036,021

UNITED STATES PATENT OFFICE 2,036,021

MANUFACTURE OF ORNAMENTAL COATED GLASS ARTICLES

Frank Dexter Cheney, New York, N. Y.

Application December 23, 1933, Serial No. 703,851

5 Claims. (Cl. 41—22)

This invention relates to improvements in processes of manufacturing ornamental reflective-coated glass articles.

Certain processes of manufacturing ornamental mirrors or reflective articles heretofore practiced provide for the initial covering or coating of one surface of a sheet of transparent material or glass with a metallic film, comprising a reflective metal such as silver, mercury, lead or the like, applying over said reflective metallic film, a film of photo-sensitive material, such as carbon-tissue or an emulsion, portions of which are exposed to light and developed to impress a design therein and to cause one portion, as for example, the portion representing the design, to become insoluble and the remaining part to be soluble, whereupon the soluble portion superimposed on the said metallic film is washed away with a suitable solvent, such as warm water. The reflective metallic film thus exposed is then etched away by a suitable acid, and thereafter another layer or film of metal of a contrasting color may be deposited on the exposed glass if desired. The reflective metallic films employed for mirrors and particularly the silver solutions so employed, are easily ruptured or marred and it is extremely difficult, in practicing processes such as hereinabove described, to avoid marring of the metallic film or that portion thereof which is to be retained in the finished article, and injury often occurs to this metallic film by the penetration of the solvent of the design-forming film of photo-sensitive material through the metallic layer or by undercutting along the edge of the design by the etching acid, thus injuring that portion of the reflective film which should be completely protected.

One of the objects of this invention is to avoid or overcome the drawbacks and difficulties heretofore encountered in such processes by providing between the design-forming film and the metallic coating a water-resistant protective coating which will not be affected by the usual solvents of the design-forming film, and which will permit portions of said design-forming film to be dissolved and washed away without penetration by the solvent of the water resistant coating to the said metallic coating.

Still another object of my invention is to provide or utilize a coating of the type hereinabove specified which will also have acid-resisting properties and which, in addition to its function of resisting and preventing access of the solvent of the design-forming film of photo-sensitive material, may also be utilized as a coating which will protect that part of the delicate metallic reflective coat which is used in the finished article against undercutting and will provide a permanent protective element therefor.

Another object of my invention is to provide in an article of the type specified, a protective film or coating which will remain permanently as a part of the finished article on or over the metallic film after the design is formed, and I also accomplish this desirable protection of the silver coating without the necessity of painting or covering by hand a metallic surface after parts of the same have been treated to form a design in said metallic surface, thus economizing in the cost of manufacture of the article.

Still another object of my invention is to provide effective methods and means whereby a design may be applied to the sheet or plate of coated glass quickly and speedily in a commercial way without breakage of the glass and without marring any film or coating on which the design is to be applied, and to this end I utilize a design-applying element composed of relatively soft material and preferably use an elastic material, such as the soft rubber blankets employed in offset printing, collotype printing, etc., but I may use for this purpose rubber stamps or stencils formed of fabric or like relatively-yieldable material.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawing in which:—

Fig. 1 is a front view of a mirror embodying my invention;

Figs. 2 to 9 are sections on the line 2—2 of Fig. 1, showing the plate of glass embodied in said mirror and illustrating the steps of my preferred process.

Referring to the drawing, 1 in all the Figures 1 to 9 indicates a plate of glass which it is desired to ornament or to manufacture into an ornamental mirror, sign or like article. In Fig. 1 of said drawing, I have illustrated an ornamental mirror or like article, embodying a sheet or plate of glass 1 provided on one surface with a metallic coating or film, such as a reflective-coating of silver, mercury, lead or the like.

In the conventional manufacture of such ornamental mirrors, a film of photo-sensitive material is superposed on the delicate metallic reflective film. This photo-sensitive film is, either before or after application, subjected to light and developed. After application of the photo-sensitive film to the glass, the soluble part is washed away and then the silver is etched away. In the washing operation, the solvent of the photo-sensitive material, which usually comprises hot water, often mars the delicate metallic coating beneath the design-forming portion of the film, and the etching-acid also frequently undercuts and mars the edges of such delicate metallic coating, thus preventing the formation of sharp and proper designs on the glass.

By the use of my present invention, I prevent access of the said solvent to the metallic film and avoid undercutting of said film by the etching acid by providing an overlying coat preferably composed of a material such as asphalt or shellac which will have the properties and functions hereafter specified, viz:—It will first form a protective coating overlying the delicate silver or other metallic coating which will keep the underlying metallic coating intact and unmarred during subsequent design-applying operations of the process; secondly, said overlying coat will form an acid-resistant film or coating so that when as a necessary part of my process acid is applied to etch away the silver or other metallic coating, said overlying coating will prevent undercutting or access of the acid to the parts of the mirror which it is desired to retain as a part of the design; and thirdly, said overlying coating will remain as a part of the finished article after the process is completed as a protective coating for the metallic coating.

In Figs. 2 to 9 I have illustrated the preferred form of my invention. In these figures, I apply on the glass 1 in any conventional manner the usual metallic coating 2 such as silver or the like and I then apply over said metallic coating a metal-overlying coating 3 which will function as a bed or supporting coat on which photo-sensitive material may be worked or manipulated, this metal overlying coating thus serving as a protective coating against access of the solvent for the photo-sensitive material to the initially-applied metallic coating, layer or film. In Fig. 2, I have shown a layer 2 of such metallic reflective coating applied on the glass of the mirror of Fig. 1. As hereinabove indicated, such metallic coatings are very delicate and easily marred and in accordance with the said preferred form of my invention, I have shown in Fig. 3 a metal-overlying coating or layer 3 which preferably comprises a protective coat, layer or film of water-and-acid resistant material and is preferably composed of asphalt or shellac. I now proceed to apply upon the said metal-overlying protective coating 3 a layer, coat or film 4 of photo-sensitive material. This layer 4 of photo-sensitive material may comprise a gelatinous material such as carbon-tissue or suitable photo-sensitive emulsion. A design is suitably impressed into such a layer of photo-sensitive material either before or after applying the said film to the glass. Such impressing of the design may be accomplished in any suitable conventional manner, and in the form of my invention illustrated in Figs. 1 to 8, it may be assumed that the layer of photo-sensitive material is impressed with a design by applying over the photo-sensitive layer a pattern having the design represented by cut-out portions therein, then exposing the portions of the photo-sensitive layers which are left bare by the cut-out portions to light and development so that the parts of the photo-sensitive layer representing the design become insoluble by water and the balance of the photo-sensitive layer protected by the pattern remain soluble.

The soluble portions may be then washed away by the use of warm water, leaving on the metal-overlying coat only the insoluble portions 4$^a$ of Fig. 5. Such washing away of the soluble portions of the photo-sensitive layer may, because of the use of the water-resistant coat 3, be accomplished without the undercutting which occurs when a surface is wetted and I find that I am enabled, on a water-resistant coating of the character specified, to procure in the photo-sensitive material a sharper and better outline in the design than it is possible to produce by the wetting or washing away of photo-sensitive material directly on the surface of the glass or on a metallic layer both of which surfaces are more readily wetted by water and to which the photo-sensitive material is not so readily adherent.

The next step of the process illustrated in said Figs. 1 to 9 comprises the removal of the exposed portions 3'—3' of the water-resistant coat 3. This may be accomplished by dissolving said exposed portion with a suitable solvent such as benzene, leaving the insoluble part 4$^a$ of the photo-sensitive material and a registering portion 3$^a$ beneath the said portion of the water-resistant coating while the design is represented by portions 2$^a$ of silvered or other metallic surface.

In view of the application of the said metal-overlying water-resistant coating this step of washing away the soluble portions of the photo-sensitive film may be accomplished without in any way marring or affecting the reflective metallic coating first applied on the glass and also these soluble parts may as aforesaid be washed away from the insoluble parts to provide a sharp design outline which will not be undercut by penetration of water.

The operation of dissolving the metal-overlying and water-resistant coating will expose portions 2'—2' of the metallic reflective coating 2 which may now be conventionally etched away by a suitable acid to leave bare-glass portions 1$^b$ in juxtaposition with superposed layer portions composed of the metallic coating 2, the metal-overlying and water-resistant coating 3 and of the photo-sensitive layer or film 4.

I find also that by using a metal-overlying coat which has acid-resisting qualities as well as water-resisting qualities, the operations of dissolving the metal-overlying coating and the etching of the metallic coating may, in view of the use in said coating of water-and-acid resistant material, be accomplished without undercutting or otherwise marring the reflective metallic coating which it is desired to protect and which, as aforesaid, is very delicate and easily marred by water and by the etching-acid unless protected therefrom.

A metal-overlying film of the type specified will also remain as a part of the finished article on or over the metallic film so as to protect the same after the design is formed, and it will be seen that I also accomplish this necessary protection of the silver coating without the necessity of painting or covering by hand a silvered surface after parts of the same have been treated to form a design in said silvered surface, and I am thus enabled to economize in the cost of manufacture of the article.

In accordance with this form of my invention, I now preferably proceed to apply over the clear glass portions 1ᵇ, a layer or coat of a contrasting material 6. This coat or layer may comprise suitably placed in juxtaposition with the design-forming reflective-coat portions on the sheet of glass.

In the preferred embodiment of my invention, I now preferably superimpose over the applied coats or coat portions, a backing 7 of any suitable backing material.

It will be apparent that the application of the design-forming coating may be accomplished by any suitable transfer method, or apparatus as for example by the use of an offset press or by employment of a stencilling or collotype method.

It will be understood that I may utilize an elastic rubber cylinder of a hand roller for applying the aforesaid coatings, or I may apply the same by any apparatus having a surface which is softer than glass and the metallic reflective coating, or under some conditions a rubber-stamp method may be employed.

From the above it will be seen that I have provided a method and have been enabled to produce decorative articles of glass such as mirrors, signs and the like, in which the metal overlying coating will because of its acid-resisting properties, enable clear-cut design-outlines to be obtained, and will also because of its acid-resisting properties, enable clear and sharp outlines to be procured in the reflective metallic coating and will also protect such metallic coating from undercutting by the etching acid necessarily employed to etch away parts of such metallic coating, and that I have also provided a permanent design protective coating over the reflective coat. It will be seen also that I have provided a commercial mechanism whereby the steps of my process may be carried out expeditiously and economically without breakage of the glass or marring of the reflective coating.

Having described my invention, I claim:—

1. A process of producing ornamental coated glass articles which consists in taking a sheet of glass, applying on said sheet of glass a film of reflective metallic material, applying on said metallic reflective film to overlie the parts thereof to be retained in the finished article, a protective layer of water-and-acid resisting material, then applying over said protective layer of water-and-acid resisting material a design-forming film, and then removing the uncovered parts of said protective layer and metallic reflective coating to be eliminated from the finished article to provide clear glass portions.

2. A process of producing ornamental coated glass articles which consists in taking a sheet of glass, applying on said sheet of glass a film of reflective metallic material, applying on said metallic reflective film to overlie the parts thereof to be retained in the finished article, a layer of water-and-acid resisting material, then applying over said layer of water-and-acid resisting material a design-forming film of photo-sensitive material, washing away by water parts of said design-forming film, and then removing the uncovered parts of said water-and-acid resistant coating and metallic reflective film to provide clear glass portions in juxtaposition with portions of said layer covered by the remaining portions of the water-and-acid resisting film.

3. A process of producing ornamental coated glass articles which consists in taking a sheet of glass, applying on said sheet of glass a film of reflective metallic material, applying on said metallic reflective film to overlie the parts thereof to be retained in the finished article, a layer of water-and-acid resisting material, then applying over said layer of water-and-acid resisting material a design-forming film of photo-sensitive material, washing away by water parts of said design-forming film, and then removing the uncovered parts of said water-and-acid resistant coating and metallic reflective film to provide clear glass portions in juxtaposition with portions of said layer covered by the remaining portions of the water-and-acid resisting film, and then applying to said clear glass portions a coating of contrasting material.

4. A process of producing ornamental coated glass articles which consists in taking a sheet of glass, applying on said sheet of glass a film of reflective metallic material, applying over said metallic reflective film a layer of water-and-acid resisting material, then applying over said layer of water-and-acid resisting material a design-forming film of photo-sensitive material, washing away by water parts of said design-forming film, then dissolving with a solvent the uncovered parts of said water-and-acid resistant coating and etching away with an acid the uncovered metallic reflective film to provide clear glass portions in juxtaposition with portions of said layer covered by the remaining portions of the design-forming film.

5. A process of producing ornamental coated glass articles which consists in taking a sheet of glass, applying on said sheet of glass a film of reflective metallic material, applying over said metallic reflective film a layer of water-and-acid resisting material, then applying over said layer of water-and-acid resisting material a design-forming film of photo-sensitive material, washing away by water parts of said design-forming film, then dissolving with a solvent the uncovered parts of said water-and-acid resistant coating and etching away with an acid the uncovered metallic reflective film to provide clear glass portions in juxtaposition with portions of said layer covered by the remaining portions of the design-forming film, and then applying to said clear glass portions a coating of contrasting material.

FRANK DEXTER CHENEY.